March 23, 1965 L. BODDY 3,175,178
ELECTRIC TEMPERATURE PROBE
Filed Jan. 8, 1963 2 Sheets-Sheet 2
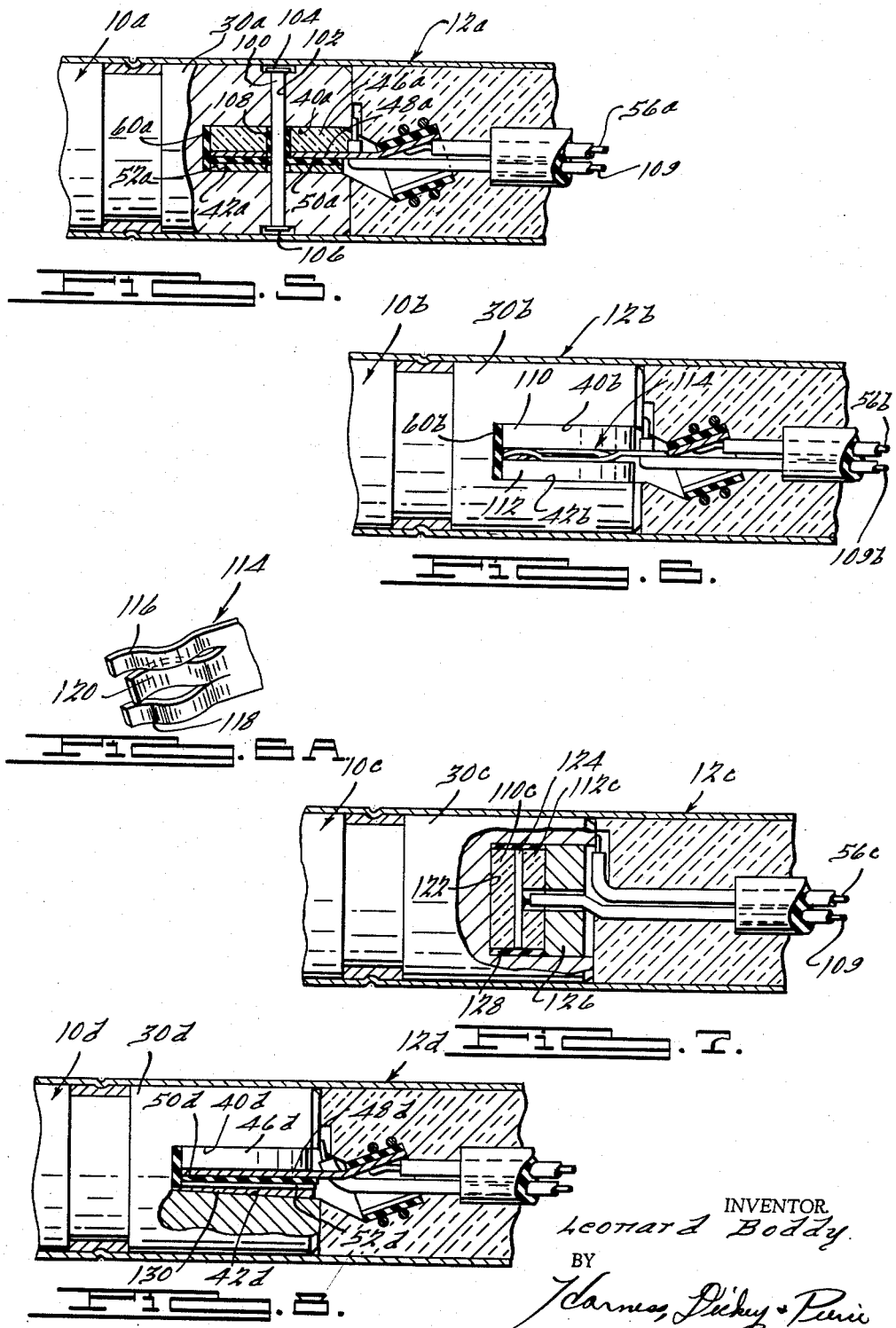
INVENTOR.
Leonard Boddy
BY
Carnes, Dickey & Pierce
ATTORNEYS

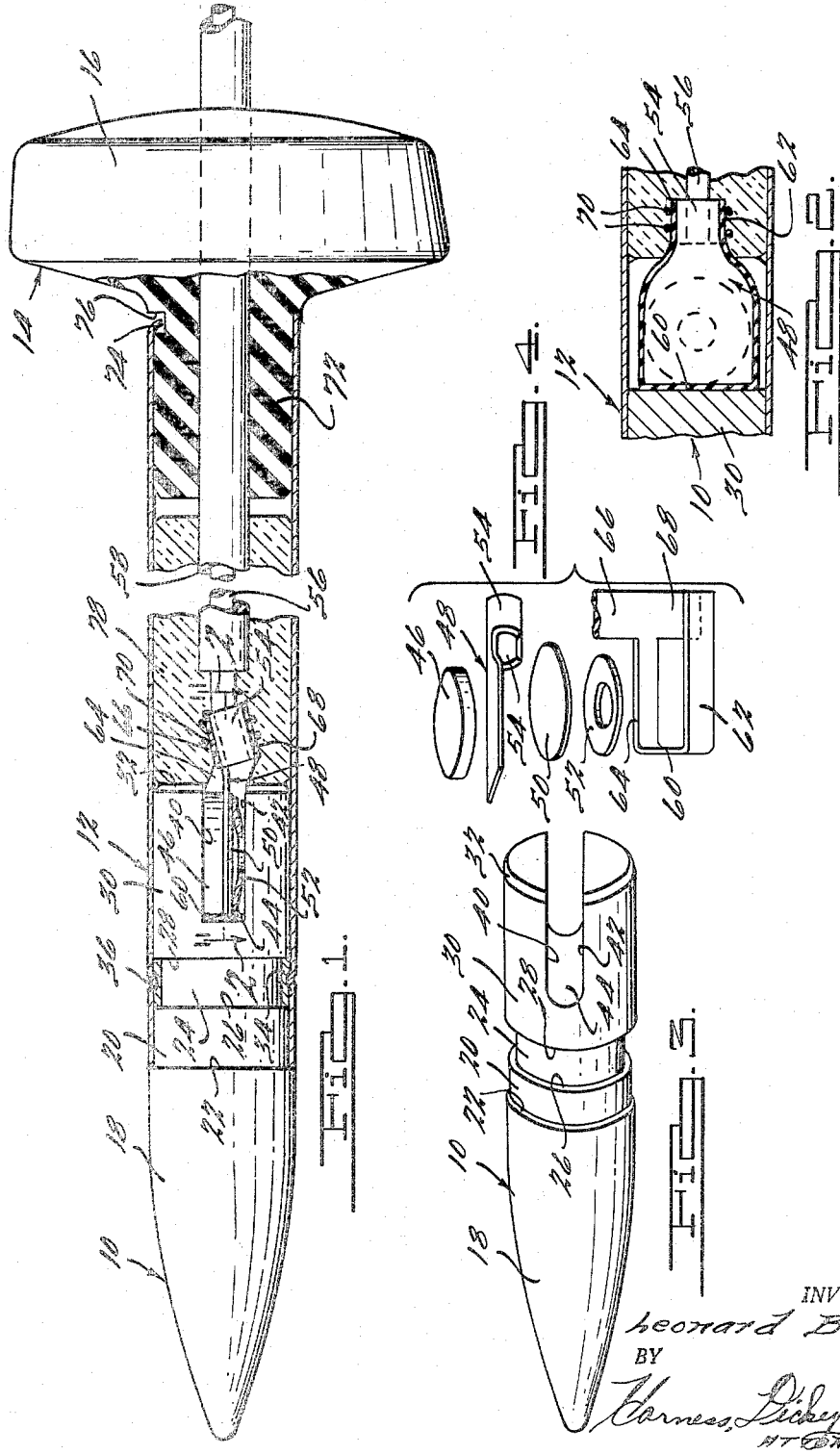

3,175,178
ELECTRIC TEMPERATURE PROBE
Leonard Boddy, Ann Arbor, Mich., assignor to King-Seeley Thermos Co., Ann Arbor, Mich., a corporation of Michigan
Filed Jan. 8, 1963, Ser. No. 250,468
29 Claims. (Cl. 338—28)

This invention relates to temperature responsive devices and more particularly to metallic probe assemblies having a temperature responsive element therein.

An object of this invention is to improve the construction of temperature responsive devices by mounting the temperature sensing element in a cavity in the tip of the temperature responsive device.

Another object of this invention is to facilitate the assembly of temperature responsive devices by constructing the tip and temperature sensing element as a preassembled subassembly.

A further object of this invention is to improve the consistency of operation of a temperature responsive device by employing spring biasing means for establishing an intimate heat transfer relationship between a sensing element and a sensing tip, with that spring means acting against a portion of the tip.

The manner of accomplishing the above objects, and other objects of the invention, will be preceived from the following detailed description of embodiments of the invention when read with reference to the accompanying drawings in which:

FIGURE 1 is a sectional view of a temperature responsive device embodying certain of the principles of the present invention;

FIG. 2 is a section taken substantially along the line 2—2 of FIG. 1;

FIG. 3 is a view showing several of the tip elements of the structure of FIG. 1;

FIG. 4 is an exploded view of the elements which are mounting within the tip in FIG. 1;

FIG. 5 is a fragmentary sectional view of a modified temperature responsive probe embodying certain of the principles of the present invention;

FIG. 6 is a fragmentary sectional view of a modified temperature responsive probe embodying certain of the principles of the present invention;

FIG. 6a is a fragmentary perspective view of one of the elements of the structure of FIG. 6;

FIG. 7 is a fragmentary sectional view of a modified temperature responsive probe embodying certain of the principles of the present invention; and FIG. 8 is a fragmentary sectional view of a modified temperature responsive probe embodying certain of the principles of the present invention.

While the principles of the present invention are of general applicability, the invention has representatively been embodied in a probe adapted for insertion into meat, fowl or the like to permit the sensing of the internal temperature thereof.

This application is a continuation-in-part of application Serial No. 733,178, filed May 5, 1958, now abandoned and the temperature responsive device which is the subject of the present application is an improvement upon the device disclosed in my prior application Serial No. 524,549, filed July 26, 1955, now Patent No. 2,925,572, and of applications referenced therein, and reference may be had to those applications for a disclosure of a suitable system with which the device of the present invention may be associated to form a temperature measuring and/or controlling system.

Referring now to FIGS. 1–4 of the drawing, the temperature responsive device comprises a tip 10 projecting from a tubular casing 12 which is provided at its rear end with a cap member 14. Member 14 includes a knob portion 16 which is intended to serve as a convenient means for grasping the assembly.

The tip 10, which is preferably manufactured from a solid piece of metal having thermal conductivity characteristics such as copper or aluminum, includes a forward generally conoidal portion 18 external of the casing 12, a first reduced diameter portion 20 defining a shoulder 22, a second, further reduced-diameter portion 24 defining shoulders 26 and 28 and establishing a peripheral groove or recess, and a portion 30 having a diameter equal to that of portion 20.

The diameter of the portions 20 and 30 is substantially the same as the internal diameter of the tubular casing 12 so that an intimate engagement is established between those mating surfaces when the unit is fully assembled. The rear end of the portion 30 is chamfered, as at 32, to facilitate assembly of the tubular casing 12 to the tip 10.

Since the operation of the temperature sensing device can be impaired by the presence of water within the casing 12, means are approved for establishing a liquid-tight seal between the tip 10 and the casing 12. The requirements of this seal are quite rigorous in view of the fact that the unit can be expected to be withdrawin from an article being cooked while at an elevated temperature, and immersed in water for washing. As will be discussed further hereinafter, such treatment tends to establish air pressure differentials tending to draw liquid within the casing.

In the disclosed sealing arrangement, a gasket 34 is placed circumferentially of the tip 10 and within the cavity or recess established by the reduced diameter portion 24 and the shoulders 26 and 28. After the tip 10 is inserted within the casing 12 to the point where the forward annular edge of the casing 12 is in abutment with the shoulder 22, the portion of the casing 12 which overlies the reduced diameter portion 24 of the tip 10 is crimped or otherwise depressed as at 36 to partially embed that portion of the casing 12 in the gasket 34. The resultant reduction in the volume occupied by the gasket serves to force the resilient gasket to conform to the shape of the cavity in which it lies.

It has been found to be desirable to employ for the gasket 34 a material which becomes sufficiently plastic to lose its resiliency and to change its shape under applied forces at a temperature above the maximum operational temperature of the probe. Satisfactory gaskets have been formed of silicone rubber, such as that sold under the trademark "Silastic," by Dow Corning.

It has been found that the sealing capabilities of the gasket material can be enhanced if, after assembly of the tip 10 and the casing 12 and crimping of the casing, the assembled unit is subjected to a temperature of 500 degrees F. for a period of about two hours during which the gasket material reaches its thermoplastic range and flows, under the applied forces, into full conformity with the shape of the cavity in which it is located. With this treatment, it has been found that temperature sensing devices of the type shown in FIG. 1 can be raised to a temperature of 500 degrees F. and then immersed in water for a period of two hours without detectable leakage.

Since the tip 10 is disposed in intimate heat transfer relationship with the article the temperature of which is to be sensed, and since the tip 10 is formed of metal having high thermal conductivity, an accurate indication of the internal temperature of the mass can be obtained by sensing the temperature of the portion 30 of the tip 10. While, in accordance with the teachings of the above-identified applications, the temperature sensing element can be mounted in intimate heat transfer relationship with the rear face of the tip element, it has now been found that improved results can be achieved if the temperature sensing element is physically disposed within a cavity in the tip. In the illustrated embodiment of the invention, a suitable cavity is formed in the portion 30 of the tip 10 by slotting the portion 30 transversely to a substantial depth, the resultant slot being defined by an end wall 44 and by walls 40 and 42 lying in substantial spaced parallelism with one another and in parallelism with the longitudinal axis of the tip 10.

The temperature sensing element, which is mounted within the cavity formed in tip 10, is preferably a thermistor disk 46 having a substantial negative temperature coefficient of resistance and having a thickness which is smaller than its diameter. Suitable such disks are readily available on the market. In the illustrated arrangement, the upper one of the two substantially parallel faces of the thermistor disk 46 is placed in abutment with the wall 40 of the cavity in the tip portion 30. Since that upper face serves as one electrical terminal of the temperature sensing element 46, and since the portion 30 of the tip 10 is employed as an element of the circuit including disk 46, a low electrical resistance junction should be formed between the upper surface of the disk 46 and the portion 30 and, similarly, since the lower face of the disk 46 serves as the other electrical terminal portion of the disk 46, good electrical conductivity should be established between that surface and the terminal 48 which is mounted in abutment therewith. To this end, both of the substantially parallel surfaces of the disk 46 may be provided with a thin plating or coating of a suitable metal such as silver.

An electrical insulator 50, representatively in the form of a circular disk, is positioned and retained in abutment with the lower surface of the terminal 48 while a spring washer 52 is trapped between the insulator 50 and the wall 42 bounding the cavity in the portion 30. The function of insulating element 50 is to prevent the establishment of an electrical short between the terminal 48 and the tip 10 through the spring washer 52 and it should, of course, be formed of material having the requisite electrical and mechanical characteristics as well as being capable of withstanding over a substantial period of time the temperatures to which the disclosed device is subjected. While other materials can be employed, a silicone impregnated glass fiber fabric has proved satisfactory.

The function of the spring washer 52 is to establish a force upon the thermistor disk 46 in a direction substantially perpendicular to its parallel faces and substantially perpendicular to the wall 40 in order to maintain the thermistor disk 46 in intimate heat transfer relationship with the tip 10. It is a significant feature of the present invention that the spring acts between the thermistor disk and a portion of the tip as opposed to acting between the thermistor disk and some remote anchoring surface within the device. The spring washer 52 should be designed to withstand the temperatures to which the device is subjected without yielding or reducing the forces which should be applied to the thermistor disk and a stainless steel spring washer was found to perform that function satisfactorily in a constructed embodiment of the invention.

The terminal 48 projects rearwardly of the cavity in the end portion 30 and is provided with a pair of clamping arms 54 which embrace the end of an electrical conductor 56. Wire 56, provided with insulation 58, extends rearwardly of and coaxially with the tubular member 12, extending through a central aperture in the cap member 14 and thence to a current measuring circuit. Since the measuring current is applied through the thermistor element which has a finite resistance, heat is developed in the thermistor the dissipation of which is retarded by the poor thermal conductivity characteristics of the thermistor material. An important characteristic of the subject construction is the intimate heat transfer relation which is established between the thermistor and the tip to improve the quenching of the thermistor.

It is necessary to electrically insulate the edge surface of the thermistor disk 46 and the edges of the terminal 48 from the tip 10. To this end, a thin sheet of insulating material is cut and formed, as best shown in FIG. 4, to have a base portion 60 and two projecting portions 62 and 64, the latter of which is provided with further tabs or projections 66 and 68. The resultant insulator element is disposed in part within the cavity in the tip portion 30, with the portion 60 abutting the end wall 44 of the cavity and with the insulator portions 62 and 64 serving to prevent shorting of the disk 46 or of the terminal 48 to the side walls of the casing 12. In the illustrated arrangement, the end of insulator portion 62 extends so as to overlie one of the clamping portions 54 of the terminal 48, while the tabs 66 and 68 are folded around the clamping portions 54 of that terminal. If desired, as illustrated in FIGS. 1 and 2, clips or wires 70 may be employed to secure the tabs 66 and 68 in place.

In addition to the knob portion 16, the cap member 14 is provided with a forwardly extending neck portion 72 having an outer diameter substantially equal to the inner diameter of the tubular casing 12. In the illustrated arrangement, after the neck portion 72 is inserted within the casing 12, a tab 74 at one point along the rear edge of the casing 12 is formed into a notch 76 formed in the neck portion 72 to retain those elements in position.

As before noted, one of the problems in units of this type is that the immersion of the unit in relatively cool water for washing at a time when it is at an elevated temperature produces contraction of the air within the unit and hence establishes a pressure differential tending to draw water into the casing. It is primarily desired to prevent water coming in contact with the electrical elements including the thermistor disk 46. As noted, the gasket 34 has been found successfully to serve as a seal at the forward end of the casing. The prevention of water leakage from the end of the casing to the thermistor disk is accomplished both by interposing a seal between those portions and by reducing the magnitude of the air pressure differential which can occur. Both ends are attained by substantially entirely filling the cavity between the rear end of the tip 10 and the forward end of the neck 72 with a solid material closely conformed to the shape of the cavity which it fills. With this arrangement, the total volume of air within the casing is relatively small.

In the illustrated arrangement, this is accomplished by utilizing a foamable thermal insulating material 78 which is foamed in place so that it will occupy substantially the entire volume of the cavity and so that it will intimately engage and conform to the shape of the casing 12 to the shape of the insulation 58 on the conductor 56 and to the other elements in that cavity. In practice, it has been found that a foamed organopolysiloxane or silicone of the type sold under the trade-mark and designation R7001 Silicone Foam Power by Dow-Corning has the requisite properties, including the capability of withstanding the temperatures to which the device is subjected. It will be observed that the filler material 78 also serves as a thermal insulator. One of the substantial advantages of the present construction is that the thermistor 46, the terminal 48, the insulator 50, the spring washer 52 and the insulator including portions 60–68 can be assembled to the tip 10 while it is as yet unassembled to the casing 12 so that those elements can be formed and tested as a subassembly and so that the prior problems of properly positioning the thermistor with relation to the tip after the tip was assembled to the casing can be avoided. This capability in the present arrangement accrues in large part from the absence of a silver soldering operation. Thus, in the assembly illustrated in the above noted patents, the tip is secured to the casing by a silver soldering operation. The present arrangement is an improvement thereover in that the unit does not have to be heated in an induction furnace whereby the ensuing processes of chemical cleaning, buffing and surfacing the tip can be obviated.

As above stated, an important characteristic of the subject construction is the intimate heat transfer relation which is established between the thermistor and the tip to improve the quenching of the thermistor. The establishment of that relationship is particularly important when ceramic, negative temperature coefficient thermistor elements are employed as the sensing elements in view of the poor thermal conductivity characteristics of the thermistor material.

The heat transfer of a thermistor, as with any uniform, essentially homogeneous material, is directly proportional to the driving potential or temperature drop, to the time, to the cross-sectional area perpendicular to the direction of heat flow, and to the specific thermal conductivity of the substance, and is inversely proportional to the thickness of the path. Since the thermistor disk is composed of metallic oxides and is ceramic in nature, its specific thermal conductivity is poor relative to most heat conductors. Therefore for best performance (quick response and low-self-heat error) theory demands the maximum surface area and minimum thickness consistent with its electrical resistance and $I^2R$ heat generation.

These $I^2R$ losses, resulting from the passage of gauging current through the thermistor element, produce an elevation of the temperature of the thermistor and result in an error in the temperature measurement by the magnitude of the temperature drop needed to effect the dissipation of this self-generated heat.

The magnitude of the error can be reduced by increasing the heat dissipating capabilities of each unit of volume of the thermistor element, and the dissipation of each such unit volume can be improved by improving its proximity to and heat-transfer relationship with a heat-accepting surface.

Consequently, the thermistor element is preferably small in thickness relative to its diameter to increase its surface area and to reduce the distance from any central unit volume to the surface of the thermistor element. Secondly, the distance between the thermistor element and a heat-accepting surface is reduced to a minimum, and the thermal conductivity of that path is maximized as far as possible commensurate with other requirements of the structure. Finally, the amount of the surface area of the thermistor which is in good heat transfer relation with a heat-accepting surface is also increased as much as possible.

In most prior thermistor-disk temperature sensing arrangements, one face of the thermistor element is placed in heat transfer relation with the probe tip. In such arrangements, if, for example, the total self-heating error of the thermistor is 5° F., that is, if the average temperature of the thermistor element at any equillibrium condition is 5° F. above the actual tip temperature, the temperature of the rear or unquenched surface may be hotter than the tip temperature by twice the amount of the noted error, that is, in the suggested example, 10° F.

In accordance with the principles of the present invention, the intimacy of the heat transfer relationship between all surfaces of the thermistor element and the tip is increased, with particular emphasis upon establishing an improved heat transfer relationship between the tip and both faces of a relatively thin thermistor element.

To improve the heat transfer relationship between the lower surface (FIGS. 1 and 4) of the thermistor disk 46 and the tip surface 42, the terminal 48 and the washer 52 are both manufactured of metal and are relatively thin, with the washer being constructed so that in its final assembled position it is as nearly flat as possible in order that (in the illustrated construction) the maximum amount of its upper surface will be in engagement with the disk 50 and so that the maximum amount of its lower surface will be in engagement with the surface 42. In practice it has been found that it is possible to construct a spring washer of this nature which is capable of exerting a force of eight to ten pounds while collapsed into a flat position and retain this load up to the maximum temperature occurring during the use of the probe. In this connection, it will be observed, that the insertion of the assembly of FIG. 4 into the slot in the tip (FIG. 3) may and normally will spread the two bifurcations of the tip slightly apart, permitting the washer 52 to be more bowed than desired. However, when the tip assembly is thereafter pressed into the sleeve 12, as facilitated by the presence of the chamber 32, the two bifurcations of the tip will be pressed back to near parallelism and the washer 52 will be flattened into contact, insuring better heat transfer. This slight flexing of the bifurcations of the tip substantially facilitates the assembly of the elements of FIG. 4 into the tip and permits larger tolerances of the parts than would otherwise be permissible, so the concept of reclamping the bifurcations into parallelism through the use of a pressed-on sleeve 12 is also a significant feature of the persent arrangement.

To further increase the heat transfer relationship between the thermistor element and the tip, the insulating disk 50 is preferably made as thin as possible commensurate with the minimum requiremnts for mechanical strength during handling and commensurate with the requisite electrical resistance characteristics. It has been found that with disks of the noted type, a high value of resistance (a megohm or more) can be obtained even though the insulating disk be but a few tenths of a thousandth of an inch in thickness, although, in practice, a disk in the order of five-to eight-thousandths of an inch in thickness is preferred for mechanical strength during handling.

Similar considerations apply to the characteristics of the transfer of heat between the edge of the thermistor element 46 and the tip. To this end, the insulating element 60 should be as thin as possible commensurate with the mechanical and electrical characteristics which are required.

It will be recognized that by virtue of this construction, a secondary path for heat flow is established from the second face of the thermistor element 46 to the tip 10, materially shortening the response time of the unit and appreciably reducing the self-heating error. As an example, if the heat transfer relationship between the lower surface of the thermistor 46 and the tip 10 were the same as the heat transfer relationship between the upper surface of disk 46 and tip 10, the self-heating error would be reduced to about half of that which would exist if only the upper surface were in good heat transfer relation with the tip. Even if the heat transfer relationship between the lower surface of the disk and the tip 10 is not as good as that between the upper surface of the disk and the tip, the magnitude of the self-heating error still can be substantially and appreciably reduced through the practice of these principles.

In the modification of FIGS. 5, 6, 7 and 8, only the central section of the probe of FIG. 1 is illustrated. The remaining portions of the probe may be similar to that of the probe of FIG. 1.

In the arrangement illustrated in FIG. 5 of the drawings, an assembly comprising a thermistor disk 46a, a terminal 48a, an insulator 50a and a spring washer 52a is sandwiched between the walls 40a and 42a of the portion 30a of the tip 10a, similar to the arrangement illustrated in FIG. 1 of the drawings. However, each of the aforesaid elements is centrally apertured to accept a rivet 100 which also passes through an aligned hole 102 formed in the portion 30a of tip 10a. The ends of that hole are counterbored to accept the heads 104 and 106 of the rivet.

In the arrangement of FIG. 1, the spring washer 52, for purposes of illustration, is shown substantially bowed. In fact, the spring washers of the illustrated nature will exert a force even though fully or essentially fully flattened when in place. The quality of the heat transfer path between the lower face of the thermistor element and the wall 42a can be enhanced if the spring washer is so compressed, in place, as to be essentially flat so that an increased area of its upper surface will be brought into good heat transfer relation with the thermistor disk 46a (via the metallic terminal 48a and the extremely thin electrical insulator 50a) and so that an increased area of the lower surface of the spring washer 52a is brought into good heat transfer engagement with the wall 42a. In the arrangement illustrated in FIG. 5 this is accomplished by actually riveting the assembly together with sufficient force being applied during the heating operation to insure that the spring washer 52a is compressed to its flat or essentially flat position.

The rivet 100, of course, should not establish an electrical short circuit between the lower face of the thermistor disk 46a and the tip 10a and in the arrangement illustrated in FIG. 5, this has been accomplished by inserting a thin electrical insulating sleeve 108 around that portion of the rivet which is adjacent the aperture in the thermistor disk 46a and the terminal 48a. The electrical insulating function could also be accomplished by insulating the rivet 100 from the tip 10a or by providing air insulation between the rivet and the thermistor and terminal.

It will be observed in the arrangement illustrated in FIG. 5 (and similarly in the arrangements of FIGS. 6, 7 and 8) that as a convenience in establishing an electrical connection between the tip 10a and the external electrical circuit a second conductor 109 (additional to conductor 56a) is brought forwardly coaxially of the unit into electrical engagement with the tip 10a, as by welding or soldering, rather than by employing the arrangement of FIG. 1 in which electrical connection is made to the tubular casing 12.

It will be noted that neither the thermistor disk 46a of FIG. 5 nor the thermistor disk 46 of FIG. 1 need necessarily be circular in cross section. For example, a thermistor of square or rectangular cross section can be employed to increase the effective heat dissipating surface area if desired.

In the modification of FIG. 6, a still greater improvement in the heat transfer relationship between the thermistor and the tip is achieved by utilizing two thermistor elements 110 and 112 rather than the single thermistor disk 46 employed in FIG. 1. Thermistor element 110 is inserted within the cavity in the tip portion 30b with one of its faces in good thermal and electrical relationship with wall 40b of that cavity whereas the other thermistor element 112 is placed within the cavity with its lower face in good thermal and electrical relationship with the wall 42b. Those good thermal and electrical relationships are illustratively established by placing the faces of the thermistor elements (which preferably and normally are metal-coated) in direct abutment with faces 42 and 42b, respectively, although if desired in this (and the other) case other metallic elements (with parallel or non-parallel faces) could be inserted between the face of the thermistor and the tip.

As in the other modifications previously discussed, the thermistor element, or in this case each thermistor element, is spring biased into intimate heat transfer relationship with the tip by a spring acting against that same tip, as opposed, for example, to an arrangement in which the reactive forces of the spring are exerted through a casing or other such element. In the modification of FIG. 6, the spring 114 is inserted between the two thermistor elements 110 and 112 so that in this case the spring presses each thermistor element into intimate heat transfer relationship with the tip by acting between that thermistor element and the tip through the other thermistor.

Thus, spring 114 forces the face of thermistor element 110 into intimate heat transfer relation with wall 40b, with the reactive forces being applied against wall 42b via thermistor element 112, and vice-versa.

Spring 114 also serves as an electrical terminal and is in good electrical conductive relationship with that face of thermistor element 110 which is remote from wall 40b and with that face of thermistor 112 which is remote from wall 42b. In the illustrated arrangement, this is accomplished by placing the spring 114 in direct engagement with those faces. Spring 114 may comprise a spring washer such as spring washer 52, a spring and a pair of plates sandwiched between the two thermistor elements 110 and 112 or otherwise, but in the illustrated arrangement, the spring is a trifurcated spring-metal element illustrated in free position in FIG. 6a. The outer two trifurcations 116 and 118 are bowed in one direction whereas the center trifurcation 120 is bowed in the opposite direction and the distance between walls 40b and 42b is selected, in the light of the thickness of thermistor elements 110 and 112 so that the spring 114 is compressed when in place.

It will be observed that the thermistor elements 110 and 112 are in parallel both in the electrical circuit and in the thermal circuit. Thus electrical current in conductor 56b flows through the terminal-spring 114, through the thermistor 110 to the tip portion 30b and then returns via conductor 109b, and electrical current in 56b also flows through terminal-spring 114, through thermistor 112 to tip portion 30b and then returns via conductor 109b. Cognizance must be taken of this fact either in the selection of the resistive characteristics of the two thermistor elements (which may be viewed as a single, split thermistor) or in the characteristics of the external circuit, or both.

Similarly, the thermistor elements 110 and 112 are effectively in parallel in the thermal circuit. Thus, assuming an equilibrium condition in which tip portion 30b has been heated to the temperature of the object the temperature of which is being sensed, the thermistor element 110 will, except at its surface, normally be at a somewhat higher temperature resulting from the self-heating effect of the current flowing through this resistive element. This heat will tend to transfer to the surface of the thermistor (through the relatively poor thermal conductive thermistor material) to the tip portion 30b. Similarly, heat will tend to flow from the interior of thermistor element 112 downwardly (in the illustrated orientation) to the tip portion 30b. There would not normally be any heat transfer from thermistor 110 to thermistor 112 or from thermistor 112 to thermistor 110 since the spring 114 is on the neutral thermal axis. However, if under unusual transient circumstances any temperature differential existed between thermistor element 110 and thermistor element 112, heat transfer between those two elements, to establish equilibrium, can relatively readily occur through the thermal conductive element 114.

It will also be observed that if under transient conditions tip portion 40b is hotter than the thermistor elements, heat can flow from portion 40b from each of the thermistor elements 110 and 112 without passing through the other.

The improved heat transfer relationships between the temperature sensing element and the tip achieved in this arrangement accrues from several factors. First, each of the two thermistor portions is illustrated to be considerably thinner than the thermistor disk 46a (FIG. 5) thereby reducing the length of the heat transfer path from the center of each thermistor element 110 or 112 to its face. Second, the sensing thermistor, viewed as a whole, in effect, has both of its two major face surfaces in excellent, direct heat transfer relation with the tip 10b so that the quality of the heat transfer relationship between the thermistor, as a whole, and the tip is improved even over that of the arrangements of FIGS. 1 and 5.

The concept of providing improved heat transfer relationship between the thermistor and the tip by forming the thermistor into two elements may also be employed where the thermistor elements are coaxial with the tip, as is illustrated in FIG. 7 of the drawings. In this case, the cavity in the tip portion 30c is formed coaxially with the tip so as to have the end wall 122 extending perpendicularly to the longitudinal axis of the tip 10c. The two thermistor elements or thermistor element portions 110c and 112c are inserted within that cavity with their faces perpendicular to the longitudinal axis of the tip 10c. If the thermistor elements 110c and 112c are circular in cross section, then normally the cavity in the tip portion 30c would be circular cylindrical although other shapes for each can well be employed.

The forward face of thermistor element 110c is placed in good heat transfer relation with the end wall 122, illustratively by direct engagement. Thermistor 112c is disposed, representatively, in spaced parallelism with element 110c and trapped therebetween is a spring element 124 of any suitable configuration. The spring element 124 is illustrated as being compressed flat but, as will be perceived, this spring is essentially on the neutral thermal axis so this is not at all important from a thermal standpoint.

The rear face of the thermistor element 112c is in good heat transfer relation with, and illustratively directly abuts, a metallic plug 126 inserted in the end of the cavity and the tip portion 30c and retained therein either by staking, welding, force fitting, screwing, or otherwise. The functions of element 126 may be accomplished by distorting the rear end of the tip portion 30c with or without additional plate between that reflective portion and the rear face thermistor element 112c, but the weight of advantage is believed to lie with the illustrated arrangement.

The rear face of thermistor element 112c is in excellent heat transfer relation with the metallic plug which is in turn in excellent heat transfer relation with tip portion 30c. As a result an excellent heat flow path is established from thermistor element 112c to tip 30c through the plug 126c just as an excellent heat transfer relationship exists between thermistor element 110c and end wall 122. Again, spring 124 acts between each of the thermistor elements and the tip, in each case through the other thermistor element.

In this arrangement, the spring element 124 also is shown to serve as the electrical terminal connection to conductor 109c, that conductor passing through a central aperture in thermistor element 112c. The edges of the two thermistors and of the spring 124 are insulated from the tip portion 30c by means of an insulator 128.

If desired, the cavity in tip 30c would extend perpendicular to the longitudinal axis of the tip 10c with the elements in that cavity still occupying the same relative positions illustrated to the cavity walls. The electrical conductor 109c could then extend through a short groove or channel formed along the outer edge of tip portion 30c.

The embodiment of FIG. 8 is or may be identical to the embodiment of FIG. 1 except that in order to illustrate that the wall portions 40d and 42d need not be exactly parallel either with one another or with the two faces of the thermistor disk 46d, the arrangement has been modified so that the lower wall 42b slopes. A tapered metallic wedge or shim 130 is then inserted such as between the wall 42d and the spring washer 52d. This arrangement has an advantage over that of FIG. 1 in that by varying the extent of the insertion of the shim, the magnitude of the force exerted by and the degree of flattening of the spring washer 52d may be controlled during assembly.

It will be noted that in each of the modifications shown in FIGS. 6 and 8, the casing may clamp the projecting leg portions of the tip portion 30b or 30d towards the thermistor if desired, as discussed in connection with FIG. 1.

While it will be apparent that the embodiments of the invention herein disclosed are well calculated to fulfil the objects of the invention, it will be appreciated that the invention is susceptible to modification, variation and change without departing from the proper scope or fair meaning of the subjoined claims.

What is claimed is:

1. A current modulating temperature responsive device comprising a tubular casing, a metallic tip coaxial with and secured within one end of said casing, said tip having a first portion lying within said casing and a second portion projecting from said casing, said first portion of said tip having a cavity in the form of a transverse slot therein having spaced wall portions, and a thermistor element having a substantial negative temperature coefficient of resistance and two substantially parallel surfaces disposed within said slot, said parallel surfaces being substantially parallel with one of said wall portions.

2. A current modulating temperature responsive device comprising a tubular casing, a metallic tip coaxial with and secured within one end of said casing, said tip having a first portion lying within said casing and a second portion projecting from said casing, said first portion of said tip having a cavity in the form of a transverse slot therein having spaced wall portions, and a thermistor element having a substantial negative temperature coefficient of resistance and two substantially parallel surfaces disposed within said slot, said parallel surfaces being substantially parallel with one of said wall portions, and means for establishing an intimate heat transfer relationship between one of said parallel surfaces and said one wall portion.

3. A current modulating temperature responsive device comprising a tubular casing, a metallic tip coaxial with and secured within one end of said casing, said tip having a first portion lying within said casing and a second portion projecting from said casing, said first portion of said tip having a cavity in the form of a transverse slot therein having spaced wall portions, a thermistor element having a substantial negative temperature coefficient of resistance and two substantially parallel surfaces disposed within said slot, said parallel surfaces being substantially parallel with one of said wall portions, and means for establishing an intimate heat transfer relationship between one of said parallel surfaces and said one wall portion comprising spring means for exerting forces upon said thermistor element in a direction towards and substantially perpendicular to said one wall portion.

4. A current modulating temperature responsive device comprising a tubular casing, a metallic tip coaxial with and secured within one end of said casing, said tip having a first portion lying within said casing and a second portion projecting from said casing, said first portion of said tip having a cavity therein, a thermistor element having a substantial negative coefficient of resistance disposed within said cavity, said element having two face surfaces and a peripheral edge portion, means including spring means acting between said element and a portion of said tip for establishing an intimate heat transfer relationship between one of said face surfaces and said tip, means for electrically insulating the other one of said face surfaces from said tip, and means for electrically insulating said peripheral edge portion of said element from said tip.

5. A current modulating temperature responsive device comprising a tubular casing, a metallic tip coaxial with and secured within one end of said casing, said tip having a portion lying within said casing and a portion projecting from said casing, an apertured cap member having a knob portion exterior of said casing and a neck portion lying within and secured to the other end of said casing, the portions of said tip and said cap member within said casing being spaced apart to define a cavity within said casing, a sensing element having a substantial temperature coefficient of resistance and having two electrical terminal portions, means for establishing an intimate heat transfer relationship between said sensing element and said tip, an electrically conductive element in electrical conductive relationship with one of the terminal portions of said sensing element, an electrical conductor extending through the aperture in said cap member and through said cavity and electrically connected to said electrically conductive element, and a foamed thermal insulating material disposed within said cavity and intimately engaging said casing and said conductor and occupying substantially the entirety of said cavity.

6. The combination of claim 5 in which said electrical conductor is provided with an insulating covering and in which said foamed thermal insulating material intimately engages said insulating covering.

7. A current modulating temperature responsive device comprising a tubular casing, a metallic tip coaxial with and secured within one end of said casing, said tip having a portion lying within said casing and a portion projecting from said casing, an apertured cap member having a knob portion exterior of said casing and a neck portion lying within and secured to the other end of said casing, the portions of said tip and said cap member within said casing being spaced apart to define a cavity within said casing, a sensing element having a substantial temperature coefficient of resistance and having two electrical terminal portions, means for establishing an intimate heat transfer relationship between said sensing element and said tip, an electrically conductive element in electrical conductive relationship with one of the terminal portions of said sensing element, an electrical conductor extending through the aperture in said cap member and through said cavity and electrically connected to said electrically conductive element, electrical insulating means for insulating said one terminal portion of said sensing element and said conductive element from said tip, and a foamed thermal insulating material disposed within said cavity and intimately engaging said casing, said insulating means and said conductor and occupying substantially the entirety of said cavity.

8. A current modulating temperature responsive device comprising a tubular casing, a metallic tip coaxial with and secured within one end of said casing, said tip having a portion lying within said casing and a portion projecting from said casing, an apertured cap member having a knob portion exterior of said casing and a neck portion lying within and secured to the other end of said casing, the portions of said tip and said cap member within said casing being spaced apart to define a cavity within said casing, a sensing element having a substantial temperature coefficient of resistance and having two electrical terminal portions, means for establishing an intimate heat transfer relationship between said sensing element and said tip, an electrically conductive element in electrical conductive relationship with one of the terminal portions of said sensing element, an electrical conductor extending through the aperture in said cap member and through said cavity and electrically connected to said electrically conductive element, and a foamed thermal insulating material disposed within said cavity and intimately engaging said casing, the portion of said tip lying within said casing and said conductor and occupying substantially the entirety of said cavity.

9. A current modulating temperature responsive device comprising a tubular casing, a metallic tip coaxial with and secured within one end of said casing, said tip having a first portion lying within said casing and a second portion projecting from said casing, said first portion of said tip having a cavity in the form of a transverse slot therein having spaced wall portions, a thermistor element having a substantial negative temperature coefficient of resistance and two substantially parallel surfaces disposed within said slot, said parallel surfaces being substantially parallel with one of said wall portions, and means for establishing an intimate heat transfer relationship between one of said parallel surfaces and said one wall portion comprising spring means for exerting forces upon said thermistor element in a direction towards and perpendicular to said one wall portion, said spring means tending to spread said wall portions out of parallelism, and said tubular casing forcing and holding said wall portions substantially in parallelism.

10. A current modulating temperature responsive device comprising a tubular casing, a metallic tip coaxial with said casing, said tip having two spaced-apart integral, substantially parallel surface portions constituting wall portions of a cavity in said tip, a thermistor element disposed within said cavity and having a substantial negative coefficient of resistance and two substantially parallel faces, one of said faces of said thermistor element being substantially parallel with one of said two spaced-apart surface portions of said tip and being in intimate thermal and electrical engagement therewith, the other one of said faces of said thermistor element lying in spaced proximity to the other one of said two spaced-apart surface portions of said tip, and means independent of said casing for establishing a good heat transfer relationship between said other face of said element and said other surface portion of said tip.

11. A current modulating temperature responsive device comprising a tubular casing, a metallic tip coaxial with said casing, said tip having two spaced-apart integral, substantially parallel surface portions constituting wall portions of a cavity in said tip, a thermistor element disposed within said cavity and having a substantial negative coefficient of resistance and two substantially parallel faces, one of said faces of said thermistor element being substantially parallel with one of said two spaced-apart surface portions of said tip and being in intimate thermal and electrical engagement therewith, the other one of said faces of said thermistor element lying in spaced proximity to the other one of said two spaced-apart surface portions of said tip, and means independent of said casing including spring means disposed between said other face of said element and said other surface portion of said tip for forcing said one face of said element towards said one surface portion of said tip.

12. A current modulating temperature responsive device comprising an elongated hollow casing, a metallic tip coaxial with and supported by and disposed adjacent one end of said casing, said tip having a portion projecting from said casing, in one direction and adapted to be disposed in heat transfer relation with a body, the major portion of the length of said casing extending from said tip in the opposite direction, said tip having a cavity therein, a temperature sensing element having a substantial temperature coefficient of resistance disposed within said cavity, means including spring means spaced from and independent of said casing acting between said element and a portion of said tip for exerting a force tending to move said element towards said tip for establishing an intimate heat transfer relationship between said element and said tip, and means including electrical conductor means within said casing electrically connected to said element and extending the length of said casing therefrom in said opposite direction for connecting said element in an electrical circuit.

13. The combination of claim 12 in which said temperature sensing element is a thermistor having a high negative temperature coefficient of resistance.

14. The combination of claim 12 in which said sensing element has two electrical terminal portions, in which said means including electrical conductor means is electrically connected to one of said two terminal portions, in which said one of said electrical terminal portions is electrically insulated from said tip, in which the other one of said electrical terminal portions is electrically connected to said tip, and in which said tip is electrically connected to said casing.

15. The combination of claim 12 in which said tip is circular in cross section, in which said casing is circular in cross section, in which the outer diameter of a first portion of said tip is substantially equal to the inner diameter of said casing, in which said first portion is disposed within and securely engages said one end of said casing, and in which said tip has a diameter adjacent said one end of said casing substantially equal to the outer diameter of said casing.

16. The combination of claim 12 in which said electrical conductor is additional to and separate from said spring means.

17. A current modulating temperature responsive device comprising an elongated hollow casing, a metallic tip coaxial with and secured within one end of said casing, said tip having a first portion lying within and engaging said casing and a second portion projecting from said casing, said first portion of said tip having a peripheral recess on the outer surface thereof, and a sealing gasket disposed within recess and sealingly engaging a portion of said casing.

18. A current modulating temperature responsive device comprising an elongated hollow casing, a metallic tip coaxial with and secured within one end of said casing, said tip having a first portion lying within and engaging said casing and a section portion projecting from said casing, said first portion of said tip having a peripheral recess on the outer surface thereof and a sealing gasket of thermoplastic material disposed within said recess and sealingly engaging a portion of said casing.

19. A current modulating temperature sensing device comprising a metallic tip having a cavity therein defined by a pair of spaced portions, means including a temperature sensing element in said cavity, and securing means engaging said tip for exerting a force tending to move said portions towards said temperature sensing element.

20. A current modulating temperature sensing device comprising a metallic tip having a cavity therein defined by a pair of spaced portions, means including an apertured temperature sensing element in said cavity, an elongated securing means engaging said portions and including a portion passing through the aperture in said apertured temperature sensing element for exerting a force tending to move said portions towards said temperature sensing element.

21. A current modulating temperature sensing device comprising a metallic tip having a cavity therein defined by a pair of spaced portions, sensing means in said cavity including a temperature sensing element and a spring means acting between said temperature sensing element and a portion of said tip, and securing means engaging said tip portions for clamping said sensing means between said portions for exerting a compressive force on said spring means.

22. The combination of claim 21 in which said securing means comprises an elongated member passing through aligned apertures in at least one of said portions, in said sensing means and in said spring means.

23. A current modulating temperature responsive device comprising a tubular casing, a metallic tip supported by said casing, said tip having two spaced-apart surface portions constituting wall portions of a cavity in said tip, a sensing resistor element disposed within said cavity and having a high temperature coefficient of resistance and two opposite faces, one of said faces of said resistor element being substantially parallel with one of said two spaced-apart surface portions of said tip, the other one of said faces of said resistor element lying in spaced proximity to the other one of said two spaced-apart surface portions of said tip, and means independent of said casing for establishing a good heat transfer relationship between said other face of said element and said other surface portion of said tip.

24. A current modulating temperature responsive device comprising a tubular casing, a metallic tip supported by said casing, said tip having two spaced-apart surface portions constituting wall portions of a cavity in said tip, a sensing resistor element disposed within said cavity and having a high temperature coefficient of resistance and two opposite faces, one of said faces of said resistor element being proximate one of said two spaced-apart surface portions of said tip and being in intimate thermal and electrical engagement therewith, the other one of said faces of said thermistor element lying in spaced proximity to the other one of said two spaced-apart surface portions of said tip, and means independent of said casing including spring means disposed between said other face of said element and said other surface portion of said tip for forcing said one face of said element towards said one surface portion of said tip.

25. A current modulating temperature responsive device comprising a tubular casing, a metallic tip supported by said casing, said tip having two spaced-apart surface portions constituting wall portions of a cavity in said tip, a sensing resistor element disposed within said cavity and having a high temperature coefficient of resistance and two opposite faces, one of said faces of said resistor element being proximate one of said two spaced-apart surface portions of said tip and being in intimate thermal and electrical engagement therewith, the other one of said faces of said thermistor element lying in spaced proximity to the other one of said two spaced-apart surface portions of said tip, and means independent of said casing for establishing an intimate heat transfer and electrical engagement between said one face of said resistor element and said one surface portion of said tip without heat soldering of said one face to said one surface portion and for establishing an improved heat transfer relation between said other face of said resistor element and said other surface portion of said tip comprising spring means disposed between said other face of said element and said other surface portion of said tip for forcing said one face of said one element towards and into said intimate heat transfer relation with said one surface portion of said tip.

26. A current modulating temperature responsive device comprising a tubular casing, a metallic tip supported by said casing, said tip having two spaced-apart surface portions constituting wall portions of a cavity in said tip, a sensing resistor element disposed within said cavity and having a high temperature coefficient of resistance and two faces, one of said faces of said resistor element being in intimate heat transfer and electrical relation with one of said two spaced-apart surface portions of said tip, the other one of said faces of said resistor element lying in spaced proximity to the other one of said two spaced-apart surface portions of said tip, and means independent of said casing for establishing an intimate heat transfer and electrical relation between said one face of said resistor element and said one surface portion of said tip without heat soldering of said one face of said resistor element to said one surface portion of said tip comprising resilient spring means disposed between said other face of said resistor element and said other surface portion of said tip for resiliently forcing said one face of said resistor element towards and into said intimate heat transfer and electrical relation with said one surface portion of said tip.

27. A current modulating temperature responsive device comprising a tubular casing, a metallic tip supported by said casing, said tip having two spaced-apart surface portions constituting wall portions of a cavity in said tip, a sensing resistor element disposed within said cavity and having a high temperature coefficient of resistance and two faces, one of said faces of said resistor element being in intimate heat transfer and electrical relation with one of said two spaced-apart surface portions of said tip, the other one of said faces of said resistor element lying in spaced proximity to the other one of said two spaced-apart surface portions of said tip, and means independent of said casing for establishing an intimate heat transfer and electrical relation between said one face of said resistor element and said one surface portion of said tip without heat soldering of said one face of said resistor element to said one surface portion of said tip and for establishing an improved heat transfer relation between said other face of said resistor element and said other surface portion of said tip comprising resilient spring means disposed between said other face of said resistor element and said other surface portion of said tip for resiliently forcing said one face of said resistor element towards and into said intimate heat transfer and electrical relation with said one surface portion of said tip, said spring means constituting a portion of a heat transfer path excluding said casing between said other face of said resistor element and said other surface portion of said tip.

28. A current modulating temperature responsive device comprising an elongated hollow casing, a metallic tip supported by said casing, said tip having a portion projecting from said casing in one direction and adapted to be disposed in heat transfer relation with a body, a portion of said casing extending from said tip in the opposite direction, said tip having a cavity therein, a temperature sensing element having a substantial temperature coefficient of resistance disposed within said cavity, and means for establishing an intimate heat transfer relationship between one portion of said element and one portion of said tip without heat soldering of said element to said tip comprising resilient spring means spaced from and independent of said casing and acting between said element and a portion of said tip and exerting a force tending to move said element towards said tip and to force said element into intimate heat transfer engagement with said tip.

29. A current modulating temperature responsive device comprising an elongated hollow casing, a metallic tip supported by said casing, said tip having a portion projecting from said casing in one direction and adapted to be disposed in heat transfer relation with a body, a portion of said casing extending from said tip in the opposite direction, said tip having a cavity therein, a temperature sensing element having a substantial temperature coefficient of resistance disposed within said cavity, and means for establishing an intimate heat transfer relationship between one portion of said element and one portion of said tip without heat soldering of said element to said tip and for establishing an improved heat transfer relation between another portion of said element and another portion of said tip comprising resilient spring means spaced from and independent of said casing and acting between said element and a portion of said tip and exerting a force tending to move said element towards said tip and to force said element into intimate heat transfer engagement with said tip, said spring means constituting a portion of a heat transfer path excluding said casing between said other portion of said element and said other portion of said tip.

References Cited in the file of this patent

UNITED STATES PATENTS

| | | |
|---|---|---|
| 497,535 | Cummings | May 16, 1893 |
| 536,184 | Case | Mar. 26, 1895 |
| 2,113,610 | Bacon | Apr. 12, 1938 |
| 2,316,872 | Kernen | Apr. 20, 1943 |
| 2,476,099 | Knudsen | July 12, 1949 |
| 2,609,406 | Barsy | Sept. 2, 1952 |
| 2,635,137 | Basham | Apr. 14, 1953 |
| 2,753,714 | Perkins et al. | July 10, 1956 |
| 2,925,572 | Boddy | Feb. 16, 1960 |
| 3,017,592 | Keller et al. | Jan. 16, 1962 |
| 3,037,179 | Otto | May 29, 1962 |

FOREIGN PATENTS

| | | |
|---|---|---|
| 658,495 | Great Britain | Oct. 10, 1951 |